United States Patent
Liu et al.

(10) Patent No.: US 6,943,527 B2
(45) Date of Patent: Sep. 13, 2005

(54) DOCKING MODULE EXCHANGEABLE WITH BATTERY MODULE OF ULTRA THIN NOTEBOOK COMPUTER

(75) Inventors: Ming-Yuan Liu, Taipei (TW); Yaz-Tzung Wu, Taipei (TW)

(73) Assignee: Inventec Corporation, Taipei (TW)

( * ) Notice: Subject to any disclaimer, the term of this patent is extended or adjusted under 35 U.S.C. 154(b) by 106 days.

(21) Appl. No.: 10/724,068

(22) Filed: Dec. 1, 2003

(65) Prior Publication Data

US 2005/0116685 A1 Jun. 2, 2005

(51) Int. Cl.⁷ .............................................. H01M 10/46
(52) U.S. Cl. ...................................... 320/107; 320/112
(58) Field of Search .............................. 320/107, 110, 320/111, 112, 113, 114, 115; 361/600, 614, 657, 715, 731, 785

(56) References Cited

U.S. PATENT DOCUMENTS 5,942,877 A * 8/1999 Nishimura .................. 320/112
6,127,801 A * 10/2000 Manor ....................... 320/112
6,563,713 B2 * 5/2003 Yang .......................... 320/112
6,621,246 B2 * 9/2003 Kubale et al. .............. 320/112

* cited by examiner

Primary Examiner—Edward H. Tso
(74) Attorney, Agent, or Firm—Bacon & Thomas PLLC

(57) ABSTRACT

The present invention is to provide a docking module exchangeable with a battery module of an ultra thin notebook computer, which comprises a plurality of I/O ports of different functions at one end of the docking module and a plurality of corresponding connectors coupled to the I/O ports at the other end thereof. The another end of the docking module may be inserted into an exposed recess disposed on the notebook computer, which is originally used for inserting the battery module thereto, and communicate with the notebook computer after the removal of the battery module from the notebook computer.

6 Claims, 3 Drawing Sheets

DOCKING MODULE EXCHANGEABLE WITH BATTERY MODULE OF ULTRA THIN NOTEBOOK COMPUTER

FIELD OF THE INVENTION

The present invention relates to notebook computers and more particularly to a docking module exchangeable with the battery module of an ultra thin notebook computer with improved characteristics.

BACKGROUND OF THE INVENTION

The availability of various new information products is even faster as time evolves. In response, people have an increasing demand to the features and quality of the information products (e.g., particularly portable computers). Thus, whether portable computers (e.g., notebook computers) produced by an electronic company in the future can provide more convenient and powerful features will be an indicator to decide whether manufacturing technology of the electronic company is more advanced than other competitive ones.

The trend of developing notebook computers is slimness, compactness, and lightweight in consideration of weight and size. Moreover, an all-in-one notebook computer is constantly being sought. Nowadays, the all-in-one notebook computers are dominant type of portable computers. Newly developed notebook computers in the years of 2003 and 2004 have a thickness of about 1 inch. Such ultra thin construction is the trend of notebook computers. Also, competition is very fierce. The battery layouts of notebook computer produced by major computer manufactures are almost the same. For example, six (6) 18650 type cylindrical lithium cells are mounted in PCG-Z1/P notebook computer available by SONY, T40 notebook computer available by IBM, or X10 notebook computer available by SAMSUNG. Note that 18650 means the cylindrical cell has a diameter of 18 mm and a height of 65 mm. Also, the battery compartment is provided at the rear side of notebook computer.

However, neither powerful Centrino notebook computers having a thickness of about 1 inch available by SONY or SAMSUNG nor notebook computers available by TOSHIBA or HP is allowed to couple to an exchangeable docking device. This is because there is interference between two mechanisms as designed. This, however, may bring inconvenience in use and cause trouble to user. In a case of a notebook computer used in home, it is required to couple connectors of power cord, mouse, network adaptor, audio video (AV) adaptor, etc to some or all ports or sockets of the notebook computer. To the contrary, a user has to disconnect all connectors coupled to the notebook computer and then couple a battery module to the notebook computer prior to carrying it for travel. After returning home, the user has to disconnect the battery module and then couple all previously coupled components to the ports or sockets prior to using the notebook computer. In view of the above, the tedious operation of coupling and disconnecting the connectors can bring great inconvenience in use and cause trouble to user. Further, it is time consuming. Obviously, it contradicts the trend and is not acceptable to vast consumers. Hence, a need for improvement exists.

SUMMARY OF THE INVENTION

A primary object of the present invention is to provide a docking module exchangeable with a battery module of an ultra thin notebook computer for ease of operation. By utilizing the present invention, the above drawbacks of the prior art can be overcome. These drawbacks are as below. The battery module at the rear of notebook computer is not allowed to couple to an exchangeable docking device due to interference between two mechanisms. It brings inconvenience in use and causes trouble to a user because a repeated process of detaching the connectors from the I/O ports and connecting the connectors to the I/O ports again is required irrespective of using the notebook computer at home or at travel.

One object of the present invention is to provide a docking module exchangeable with a battery module of an ultra thin notebook computer. The docking module has the benefits of simple construction and no interference between two mechanisms. The present invention is characterized in that a plurality of I/O ports of different functions are provided at one end of the docking module and a plurality of corresponding connectors coupled to the I/O ports. By configuring as above, it is possible of inserting another end of the docking module into an exposed recess disposed on the notebook computer, which is originally used for inserting the battery module thereto, after the removal of the battery module from the notebook computer. The docking module is then able to communicate with the notebook computer. This eliminates the tedious, repeated process of detaching the connectors from the I/O ports and connecting the connectors to the I/O ports again irrespective of using the notebook computer at home or at travel. Moreover, an exchangeability of the battery module of the notebook computer and the docking module and a simple operation are carried out by the present invention.

The above and other objects, features and advantages of the present invention will become apparent from the following detailed description taken with the accompanying drawings.

DETAILED DESCRIPTION OF THE PREFERRED EMBODIMENTS

Figure 1:
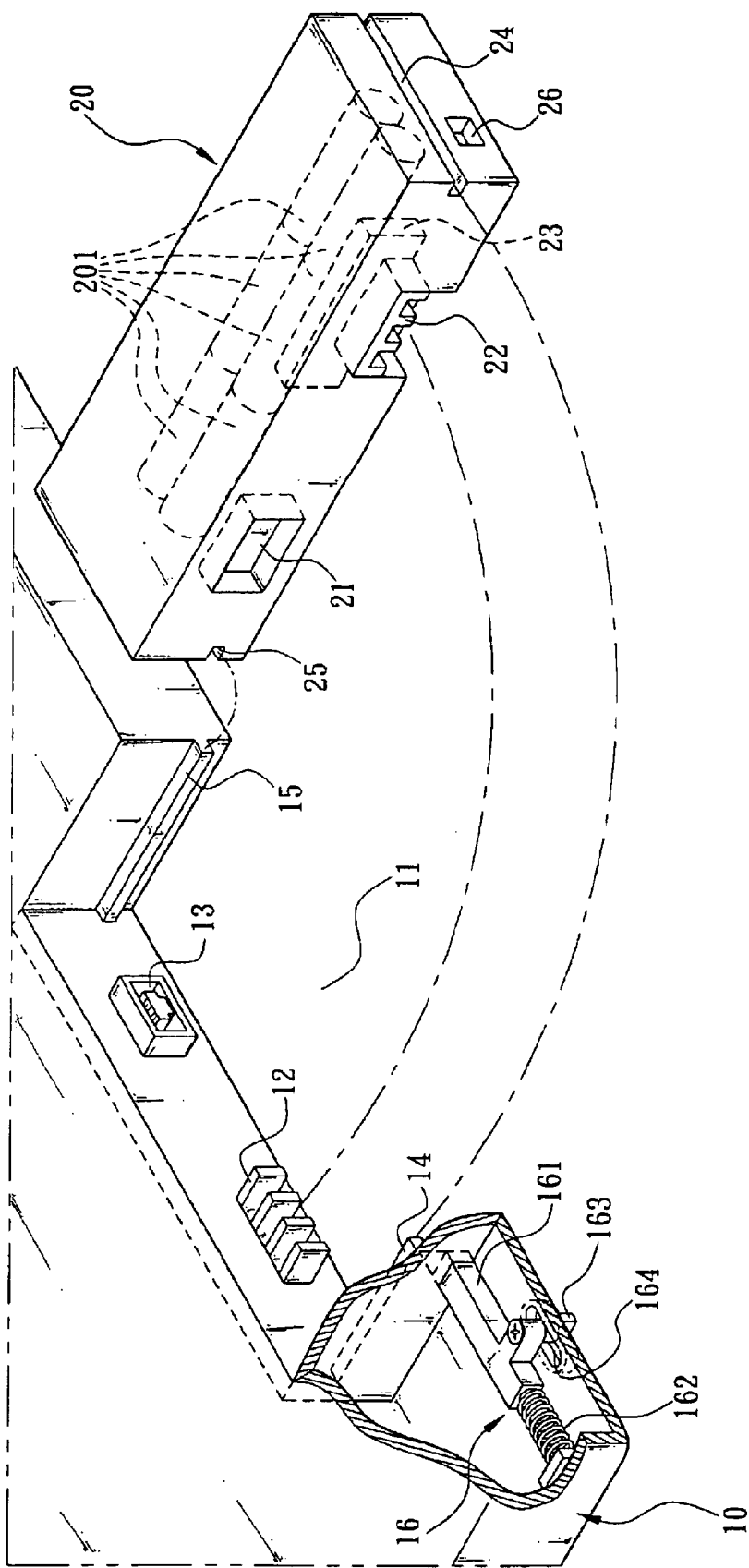
FIG. 1 is a perspective view of a battery module to be coupled to a notebook computer according to the invention, where a portion of the notebook computer is broken away.
Figure 2:
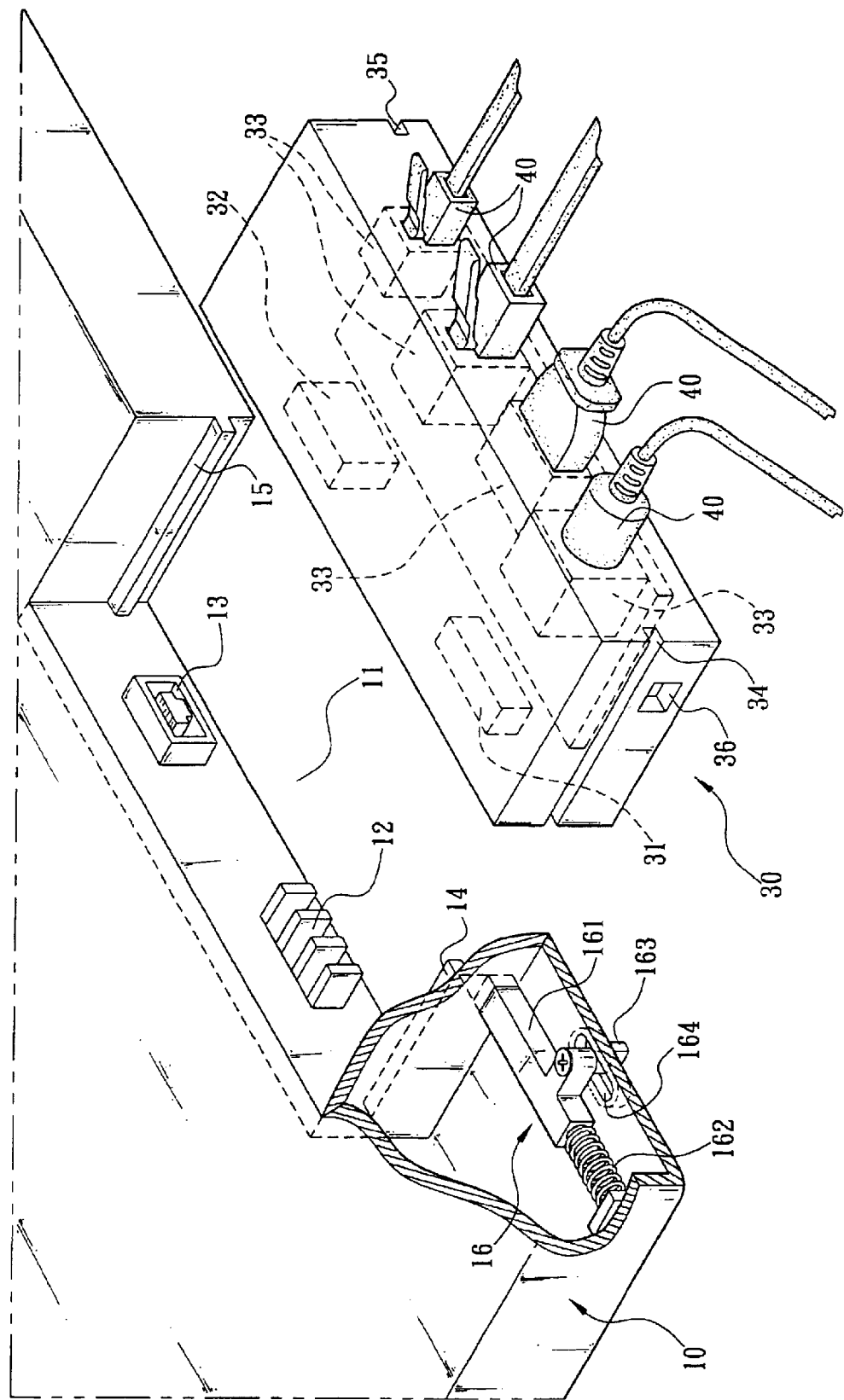
FIG. 2 is a perspective view of a first preferred embodiment of docking module to be coupled to the notebook computer according to the invention, where a portion of the notebook computer is broken away.

Referring to FIGS. 1 and 2, there is shown a docking module exchangeable with a battery module of an ultra thin notebook computer in accordance with the invention. The invention comprises an ultra thin notebook computer 10, a parallelepiped battery module 20, and a parallelepiped docking module 30 which is constructed according to a first preferred embodiment. In FIG. 1, a rectangular recess 11 is formed at a rear of the notebook computer 10. A first connector 12 and a spaced second connector 13 are provided at the bottom side of the recess 11. Also, a first rail 14 and a second rail 15 are provided on two opposite sides of the recess 11. The height of the first rail 14 is slightly higher than that of the second rail 15. A locking mechanism 16 is provided proximate the first rail 14. The locking mechanism 16 comprises a latch 161, a spring 162, and a pivotal lever 163. One end of the latch 161 is projected from the first rail 14 at the recess 11 and the other end thereof is disposed inside the locking mechanism 16 to be urged by one end of the spring 162. The other end of the spring 162 is urged against the inner wall of the locking mechanism 16. One end of the lever 163 is projected from the bottom of the latch 161 and an elongated opening 164 on the bottom of the locking mechanism 16. As such, a user can manipulate the lever 163 to cause the latch 161 to either compress or expand the spring 162 for unlocking or locking the latch 161.

In the invention the battery module 20 is implemented as a set of 6 to 8 cells 201. A cavity 21 is provided at one end of the battery module 20. The cavity 21 is adapted to receive the second connector 13. Also, a third connector 22 is provided at one end of the battery module 20. The third connector 22 is adapted to couple to the mated first connector 12. By configuring as above, the battery module 20 is adapted to insert into the recess 11 to supply power to the notebook computer 10 for maintaining its normal operation. The third connector 22 is coupled to a circuit board 23 inside the battery module 20. A first groove 24 and a second groove 25 are provided on two sides of the battery module 20 in which the height of the first groove 24 is slightly higher than that of the second groove 25. Also, a locking hole 26 is provided proximate the first groove 24. By configuring as above, the battery module 20 will not be fastened in the recess 11 if the insertion of the battery module 20 into the recess 11 is not correct. This is a foolproof design. In other words, the locking of the battery module 20 is made possible only by correctly sliding the first groove 24 and the second groove 25 along the first rail 14 and the second rail 15 at the recess 11 respectively and extending the spring-biased latch 161 in the locking hole 26 after compressing the latch 161 in the above sliding operation.

Referring to FIG. 2, a cavity 31 is provided at one end of the docking module 30. The cavity 31 is adapted to receive the first connector 12. Also, a fourth connector 32 is provided at one end of the docking module 30. The fourth connector 32 is adapted to couple to the mated second connector 13. By configuring as above, the docking module 30 is adapted to insert into the recess 11 after removing the battery module 20 from the recess 11 of the notebook computer 10. A plurality of input/output (I/O) ports 33 of different functions (e.g., power jack, USB port, RJ-11 port for connecting to network, RJ-45 port for connecting to network, etc.) are provided at the other opposite end of the docking module 30. A plurality of corresponding connectors 40 are adapted to couple to the I/O ports 33. A third groove 34 and a fourth groove 35 are provided on two sides of the docking module 30 in which the height of the third groove 34 is slightly higher than that of the fourth groove 35. Also, a second locking hole 36 is provided proximate the third groove 34. By configuring as above, the docking module 30 will not be fastened in the recess 11 if the insertion of the docking module 30 into the recess 11 is not correct. This is a foolproof design. In other words, the locking of the docking module 30 is made possible only by correctly sliding the third groove 34 and the fourth groove 35 along the first rail 14 and the second rail 15 at the recess 11 respectively and extending the spring-biased latch 161 in the second locking hole 36 after compressing the latch 161 in the above sliding operation.

Figure 3:
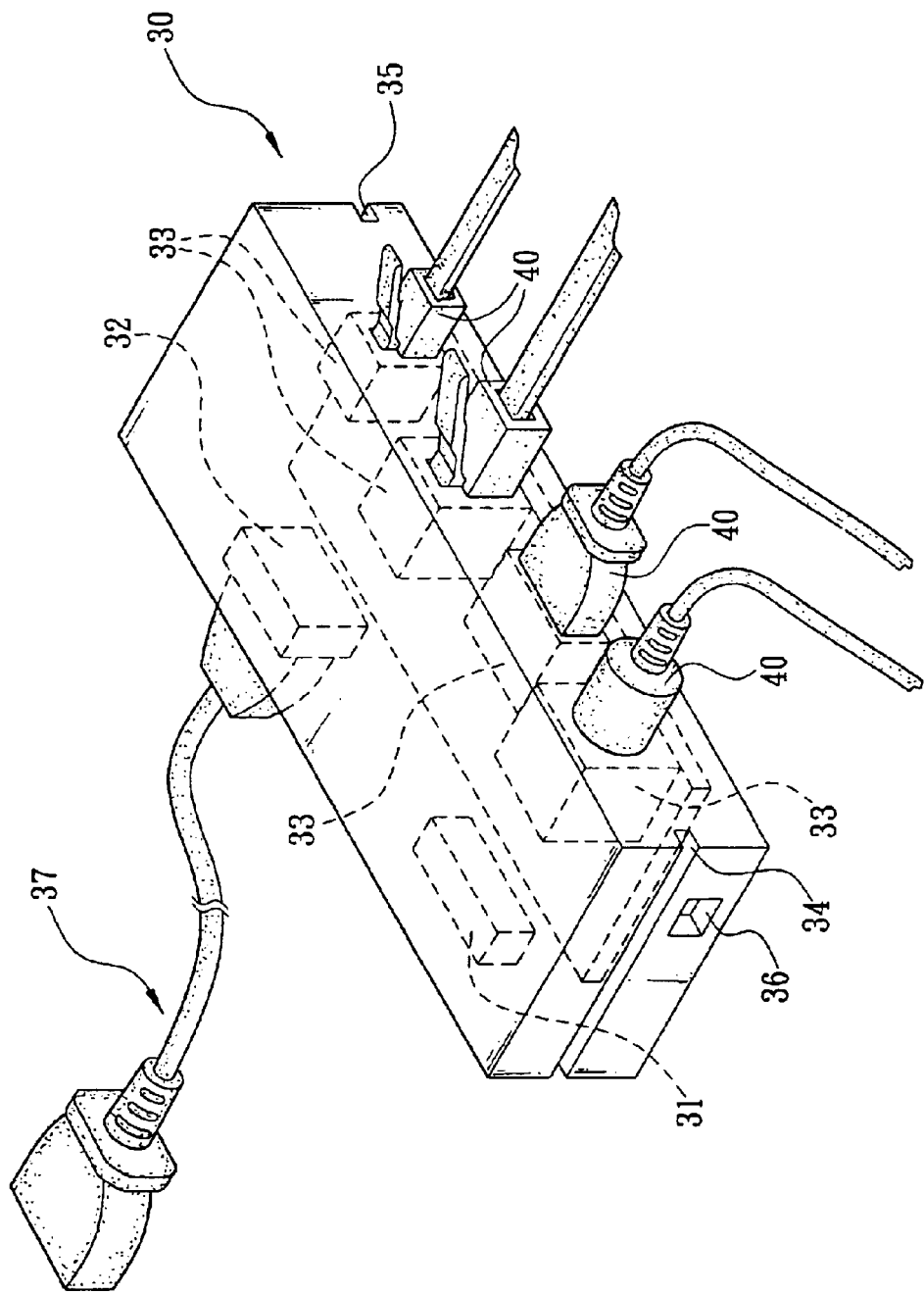
FIG. 3 is a perspective view of a docking module according to a second preferred embodiment of the invention.

Referring to FIG. 3, there is shown a second preferred embodiment of docking module 30. The docking module 30 comprises a fourth connector 32 adapted to couple to the mated second connector 13, and a long cable adapter 37 having one end coupled to the fourth connector 32 and the other end coupled to the second connector 13 at the recess 11 of the notebook computer 10. Thus, a user can move the notebook computer 10 to a distal place by pulling the cable adapter 37. This can bring convenience to user in operating the notebook computer 10.

By configuring as above, it is seen that a user can manipulate the lever 163 to detach the battery module 20 from the notebook computer 10 when the battery module 20 is not in use, for example, at home. At this time, the recess 11 is exposed. Next, insert one end of the docking module 30 having the cavity 31 and the fourth connector 32 into the recess 11 with the plurality of corresponding connectors 40 already being coupled to the I/O ports 33 at the other end of the docking module 30. Once the docking module 30 is firmly inserted into the recess 11, the notebook computer 10 is able to operate.

To the contrary, a user can manipulate the lever 163 to quickly detach the docking module 30 from the notebook computer 10 prior to using the notebook computer 10 when traveling. At this time, the recess 11 of the notebook computer 10 is exposed. Next, insert one end of the battery module 20 having the cavity 21 and the third connector 22 into the recess 11. Hence, the battery module 20 is adapted to supply power to the notebook computer 10 for maintaining its normal operation.

In brief, the characteristic of the invention is the exchangeability of the battery module 20 and the docking module 30. Also, the plurality of I/O ports 33 of different functions are provided at the other opposite end of the docking module 30 with the plurality of corresponding connectors 40 being already coupled to the I/O ports 33. By configuring as above, it is possible of inserting one end of the docking module 30 into the exposed recess 11 due to the removal of the battery module 20 from the notebook computer 10. The docking module 30 is then able to communicate with the notebook computer 10. This eliminates the tedious, repeated process of detaching the connectors 40 from the I/O ports 33 and connecting the connectors 40 to the I/O ports 33 again. Moreover, an exchangeability of the battery module 20 of the notebook computer 10 and the docking module 30 and a simple operation are carried out by the invention. In addition, the invention has the benefits of simple construction, no interference between two mechanisms, and being ergonomic without the disadvantages of the prior art.

While the invention has been described by means of specific embodiments, numerous modifications and variations could be made thereto by those skilled in the art without departing from the scope and spirit of the invention set forth in the claims.

What is claimed is:

1. A docking module exchangeable with a battery module of an ultra thin notebook computer, comprising:

a notebook computer including a recess at one end, a first connector at a bottom of the recess, and a second connector at the bottom of the recess;

a parallelepiped battery module including a first cavity at one end for receiving the second connector, and a third connector at one end for coupling to the first connector so that the battery module is adapted to insert into the recess to supply power to the notebook computer for operation; and a parallelepiped docking module including a second cavity at one end for receiving the first connector, a fourth connector at one end for coupling to the second connector so that the docking module is adapted to insert into the recess for communicating with the notebook computer after removing the battery module from the recess, and a plurality of I/O ports of different functions at the other end, the I/O ports being adapted to couple to a plurality of corresponding connectors.

2. The docking module of claim 1, wherein the battery module further comprises a first groove at one side and a second groove at the other side, a height of the first groove being slightly higher than that of the second groove.

3. The docking module of claim 2, further comprising a locking mechanism proximate the first rail, wherein the locking mechanism comprises:
- a latch having one end projected from the first rail at the recess and the other end disposed inside the locking mechanism;
- a spring having one end urged against the other end of the latch and the other end urged against an inner wall of the locking mechanism; and
- a lever having one end projected from a bottom of the latch and an elongated opening on a bottom of the locking mechanism so that a manipulation of the lever will cause the latch to either compress or expand the spring for unlocking or locking the latch.

4. The docking module of claim 3, further comprising a circuit board inside the battery module, the circuit board being coupled to the third connector, a first groove on one side of the battery module, a second groove on the other side of the battery module, a height of the first groove being slightly higher than that of the second groove, and a first locking hole proximate the first groove, whereby correctly sliding the first groove and the second groove along the first rail and the second rail at the recess respectively and extending the latch in the first locking hole will lock the battery module in the recess.

5. The docking module of claim 3, wherein the docking module further comprises a third groove at one side, a fourth groove at the other side, a height of the third groove being slightly higher than that of the fourth groove, and a second locking hole proximate the third groove so that correctly sliding the third groove and the fourth groove along the first rail and the second rail at the recess respectively and extending the latch in the second locking hole is adapted to lock the docking module in the recess.

6. The docking module of claim 5, wherein the docking module further comprises a long cable adapter having one end coupled to the fourth connector and the other end coupled to the second connector at the recess so that the notebook computer is adapted to move to a distal place by pulling the cable adapter in operation.

* * * * *